United States Patent
Kobayashi

(10) Patent No.: US 9,266,428 B2
(45) Date of Patent: Feb. 23, 2016

(54) CAPLESS FUEL FILLER ASSEMBLY FOR VEHICLE

(71) Applicant: Honda Motor Co., Ltd., Tokyo (JP)

(72) Inventor: Kazuhiro Kobayashi, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 14/252,815

(22) Filed: Apr. 15, 2014

(65) Prior Publication Data

US 2015/0291022 A1    Oct. 15, 2015

(51) Int. Cl.
*B60K 15/01* (2006.01)
*B60K 15/05* (2006.01)
*B60K 15/00* (2006.01)
*B60K 15/04* (2006.01)
*B60K 15/03* (2006.01)

(52) U.S. Cl.
CPC ....... *B60K 15/05* (2013.01); *B60K 2015/03493* (2013.01); *B60K 2015/048* (2013.01); *B60K 2015/0461* (2013.01); *B60K 2015/053* (2013.01)

(58) Field of Classification Search
CPC ................... B60K 2015/04; B60K 2015/0429; B60K 2015/0461; B60K 2015/0483; B60K 15/05; B60K 2015/053; B60K 2015/048; B60K 2015/03493
USPC ................................................ 220/86.2, 86.3
See application file for complete search history.

(56) References Cited

U.S. PATENT DOCUMENTS

| | | | |
|---|---|---|---|
| 2,206,948 A | 7/1940 | Frankford | |
| 5,271,438 A | 12/1993 | Griffin et al. | |
| 6,431,228 B2 | 8/2002 | Foltz et al. | |
| 6,446,826 B1 | 9/2002 | Foltz et al. | |
| 6,539,990 B1 | 4/2003 | Levey et al. | |
| 6,722,407 B2 | 4/2004 | Henry | |
| 6,968,874 B1 | 11/2005 | Gabbey et al. | |
| 6,983,773 B1 | 1/2006 | Hagano et al. | |
| 7,007,726 B1 | 3/2006 | Martin et al. | |
| 7,246,642 B2 | 7/2007 | Foltz et al. | |
| 7,302,977 B2 | 12/2007 | King et al. | |
| 7,318,462 B2 * | 1/2008 | Ganachaud | B60K 15/04 141/301 |
| 7,621,303 B2 | 11/2009 | Buchgraber | |
| 7,665,493 B2 | 2/2010 | Groom et al. | |

(Continued)

FOREIGN PATENT DOCUMENTS

WO    2012020128    2/2012

OTHER PUBLICATIONS

Website: http://http://www.magna.com/capabilities/vehicle-engineering-contract-manufacturing/product-services/fuel-systems dated Dec. 3, 2013.

*Primary Examiner* — Mickey Yu
*Assistant Examiner* — Niki Eloshway
(74) *Attorney, Agent, or Firm* — Rankin, Hill & Clark LLP

(57) ABSTRACT

A fuel filler assembly for a vehicle includes a main flap unit connected to a fuel filler pipe adjacent a filling end thereof and a main flap pivotally disposed on the main flap unit for selectively closing access to the filling end of the fuel filler pipe. The fuel filler assembly further includes a shutter unit connected to the fuel filler pipe adjacent the filling end thereof and engaging the main flap unit, and a shutter pivotally disposed on the shutter unit for selectively closing access to the filling end of the fuel filler pipe. Cooperative engagement (e.g., an interference fit) between the main flap unit and the shutter unit seals the main flap unit and the shutter unit together and prevents fuel from leaking therebetween.

20 Claims, 2 Drawing Sheets

(56) References Cited

U.S. PATENT DOCUMENTS

| | | |
|---|---|---|
| 8,333,890 B2 | 12/2012 | Wells et al. |
| 8,522,838 B2 | 9/2013 | Gurtatowski |
| 8,555,937 B2 | 10/2013 | Murabayashi et al. |
| 2005/0199315 A1 | 9/2005 | Scharrer |
| 2006/0032552 A1* | 2/2006 | Hedevang ............... B60K 15/04 141/367 |
| 2007/0056654 A1 | 3/2007 | Poley et al. |
| 2008/0087354 A1 | 4/2008 | Cisternino et al. |
| 2009/0001077 A1* | 1/2009 | Feichtinger ............ B60K 15/04 220/86.2 |
| 2009/0095373 A1 | 4/2009 | Correira et al. |
| 2010/0218849 A1 | 9/2010 | Hagano |
| 2012/0217240 A1 | 8/2012 | Dutzi et al. |
| 2013/0075395 A1* | 3/2013 | Hagano ............... B60K 15/0406 220/86.2 |
| 2013/0213963 A1* | 8/2013 | Chretien ................. B67D 7/06 220/86.2 |
| 2013/0228576 A1* | 9/2013 | Gerdes ............... B60K 15/0406 220/86.2 |

* cited by examiner

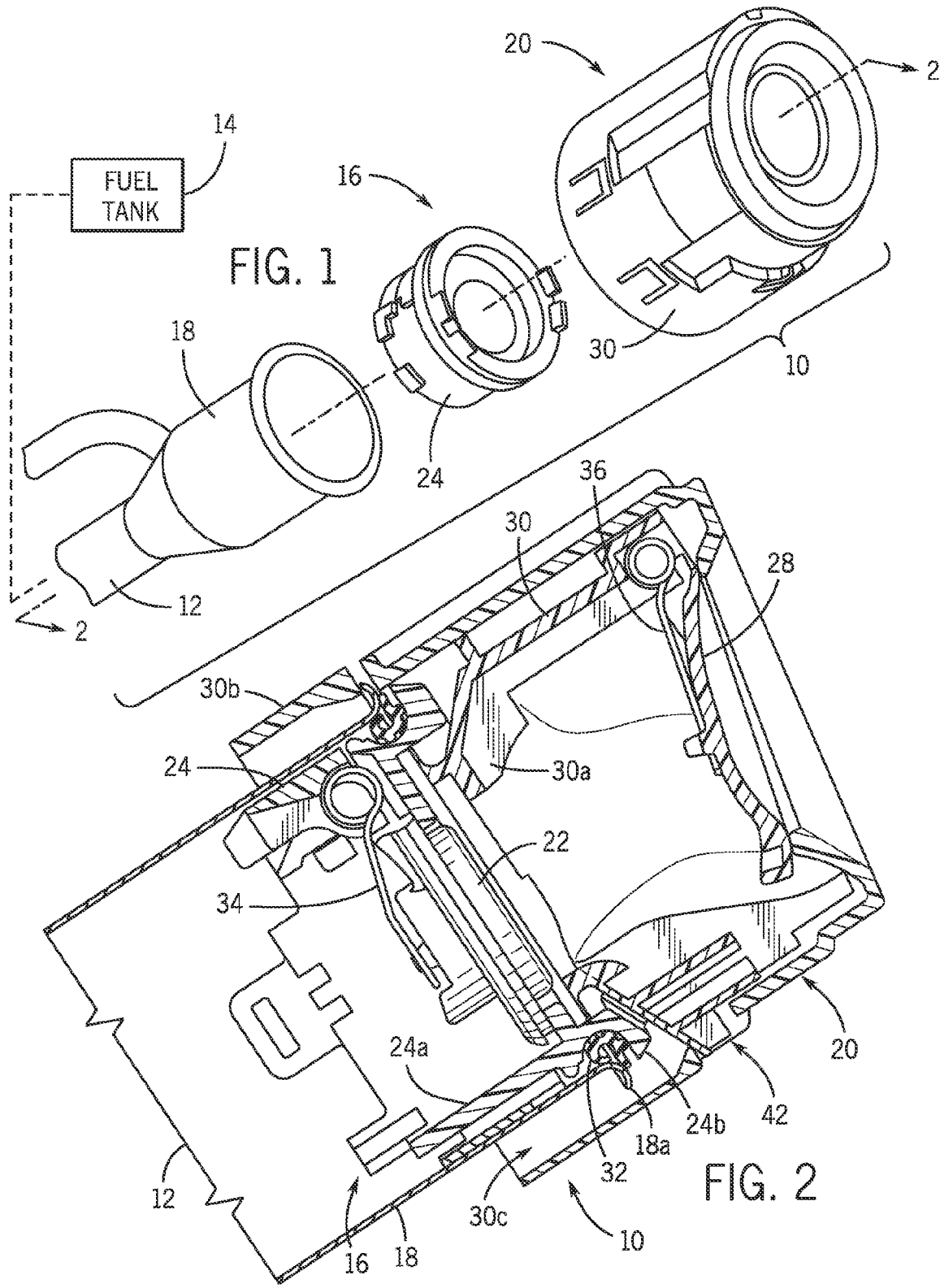

`US 9,266,428 B2`

CAPLESS FUEL FILLER ASSEMBLY FOR VEHICLE

BACKGROUND

Fuel systems on vehicles typically include a filler tube fluidly connected to a fuel tank for refilling the fuel tank (e.g., at a filling station). Conventionally, a removable cap is threadedly secured to a distal end of the filler tube to close the tube when not in use. During refueling, the cap is removed to provide access to the filler tube by a refueling nozzle. More recently, there has been interest in so-called capless refueling systems where no cap is threadedly secured to the end of the filler tube. Instead, one or more closure members are pivotally secured within a capless assembly provided on the end of the filler tube and each is biased toward a closed position. The closure can be opened against such biasing via insertion of the refueling nozzle. Sometimes, such pivotally mounted closures are provided in series to better ensure complete closure of the filler tube (e.g., one pivoting closure is provided upstream from another pivoting closure). One drawback with capless refueling systems is that they tend to be more expensive than conventional cap-type refueling systems.

SUMMARY

According to one aspect, a fuel filler assembly for a vehicle includes a main flap unit connected to a fuel filler pipe adjacent a filling end thereof and a main flap pivotally disposed on the main flap unit for selectively closing access to the filling end of the fuel filler pipe. The fuel filler assembly further includes a shutter unit connected to the fuel filler pipe adjacent the filling end thereof and engaging the main flap unit, and a shutter pivotally disposed on the shutter unit for selectively closing access to the filling end of the fuel filler pipe. Cooperative engagement between the main flap unit and the shutter unit seals the main flap unit and the shutter unit together and prevents fuel from leaking therebetween.

According to another aspect, a capless fuel filler assembly includes a filler tube connected to a fuel tank, a main flap housing secured to the filler tube, and a shutter housing secured to the filler tube. The main flap housing has a pivoting flap adapted to be pivoted open by an associated fuel nozzle. The shutter housing has a pivoting shutter also adapted to be pivoted open by the associated fuel nozzle. The shutter housing is arranged so that the associated fuel nozzle first opens the pivoting shutter and subsequently opens the pivoting flap when inserted into the filler tube for refueling the fuel tank. The shutter housing cooperatively engages the main flap housing to seal therebetween.

According to a further aspect, a capless fuel filler assembly for a vehicle includes a main flap housing securable to a fuel filler pipe and a shutter housing secured to the main flap housing. The main flap housing has a main flap pivotally disposed thereon. The shutter housing has a shutter flap pivotally disposed thereon. The assembly additionally includes a cooperative engagement between the main flap housing and the shutter housing that seals therebetween and prevents fuel from leaking between the main flap housing and the shutter housing.

BRIEF DESCRIPTION OF THE DRAWINGS

FIG. 1 is an exploded perspective view of a fuel filler assembly for a vehicle according to an exemplary embodiment.

FIG. 2 is a cross-section view of the fuel filler assembly of FIG. 1 taken along the line 2-2 but shown in an assembled state.

DETAILED DESCRIPTION

Figure 3:
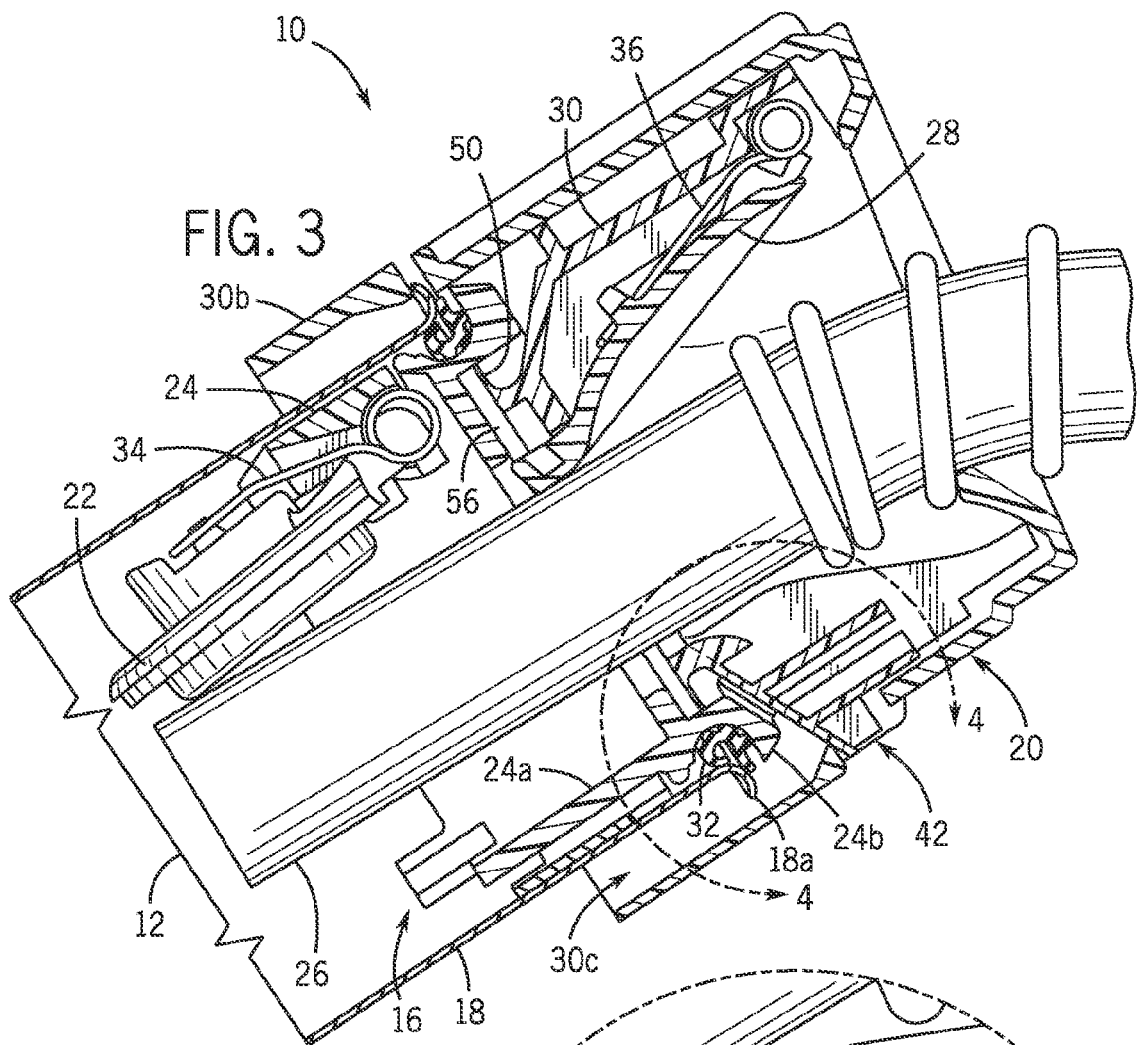
FIG. 3 is a cross-section view similar to FIG. 2 but showing a refueling nozzle inserted into the fuel filler assembly.

Referring now to the drawings wherein the showings are for purposes of illustrating one or more exemplary embodiments and not for purposes of limiting the same, a capless fuel filler assembly for a vehicle is shown and generally designated by reference numeral 10. As shown, the filler assembly 10 includes a filler tube or fuel filler pipe 12 connected to a fuel tank 14 (shown schematically). The assembly 10 further includes a main flap unit 16 connected to the filler tube 12 adjacent a filling end 18 thereof and a shutter unit 20 connected to the filler tube 12 adjacent the filling end 18 thereof and engaging the main flap unit 16.

A main flap 22 is pivotally disposed on the main flap unit 16 for selectively closing access to the filling end 18 of the filler tube 12. More specifically, the main flap unit 16 includes a main flap housing 24 secured or securable to the filler tube 12. The main flap housing 24 has the main flap or pivoting flap 22 pivotally connected thereto and adapted to the pivoted open by an associated fuel nozzle 26 (shown in FIG. 3). Similarly, a pivoting shutter 28 is pivotally disposed on the shutter unit 20 for selectively closing access to the filling end 18 of the filler tube 12. The main flap housing 24 and/or the shutter housing 30 can each be formed of a plastic material, though this is not required.

More specifically, the shutter unit 20 includes a shutter housing 30 secured or securable to the filler tube 12. The shutter housing 30 has the shutter 28 pivotally connected thereto and also adapted to be pivoted open by the fuel nozzle 26. The shutter housing 30 and the main flap housing 24 are particularly arranged so that the fuel nozzle 26 first opens the shutter 28 and subsequently opens the main flap 22 when inserted into the filler tube 12 for refueling the fuel tank 14 (i.e., the shutter 28 is upstream from the main flap 22). As will be described in more detail below, cooperative engagement between the main flap unit 16 and the shutter unit 20 (e.g., the shutter housing 30 cooperatively engages the main flap housing 24) seals the main flap unit 16 and the shutter unit 20 together and prevents fuel from leaking therebetween.

In the illustrated embodiment, the main flap housing 24 includes an insertion portion 24a that is received inside the filling end 18 of the filler tube 12 and a head or collar portion 24b that sits adjacent a distal flared end 18a of the filling end 18. The main flap 22 is pivotally secured to the head portion 24b. A resilient seal or gasket 32 can be radially interposed between the head portion 24b of the main flap housing 24 and the filler end 18 of the filler tube 12, and particularly the distal flared end 18a of the filling end 18. The main flap unit 16 also includes a main unit spring 34 that urges the main flap 22 toward a closed position (the position shown in FIG. 2).

The shutter housing 30 includes an axial insertion portion 30a that is received radially within the main flap unit 16 and an outer wall portion 30b that annularly surrounds the main flap unit 16. A sleeve-type recess 30b is radially defined between the axial insertion portion 30a and the outer wall portion 30b and this recess 30c receives the filler end 18 of the filler tube 12 therein. The shutter 28 is pivotally secured to the shutter housing 30 at an end opposite the axial insertion portion 30a. The shutter unit 20 includes a shutter unit spring 36 that urges the shutter 28 toward a closed position (the position shown in FIG. 2). As shown, tab features 38, 40 can be provided on the outer wall portion 30b for cooperatively engaging the distal flared end 18a of the filling end 18 to secure the main flap housing 24 directly to the filler tube 12. Also, the shutter housing 30 can define a radial drain 42 that is arranged on a lower side of the assembly 10 (i.e., a side closer to the ground when the filler assembly 10 is provided on a vehicle) that allows fuel from the fuel nozzle 26 that does not make it into the filler tube 12 (e.g., spilled fuel) to drain out of the assembly 10 at or to a desired location.

The cooperative engagement between the main flap unit 16 and the shutter unit 20, and more particularly between the main flap housing 24 and the shutter housing 30, includes a radial flange (e.g., radial flange 50) disposed on one of the main flap unit 16 (or main flap housing 24) and the shutter unit 20 (or the shutter housing 30) and a mating surface (e.g., cylindrical wall 54) to which the radial flange is in sealing contact or engagement disposed on the other of the main flap unit 16 (or a main flap housing 24) and the shutter unit 20 (or shutter housing 30). The cooperative engagement is formed by the flange being in sealing contact with the mating surface. In one exemplary embodiment, sealing contact between the flange and the mating surface is via interference fit thereby sealing the main flap unit 16 and the shutter unit 20. In the same or another embodiment, the radial flange can extend or be provided generally in a radially plane and the mating surface can be generally parallel to an axis of the filler tube 12.

Figure 4:
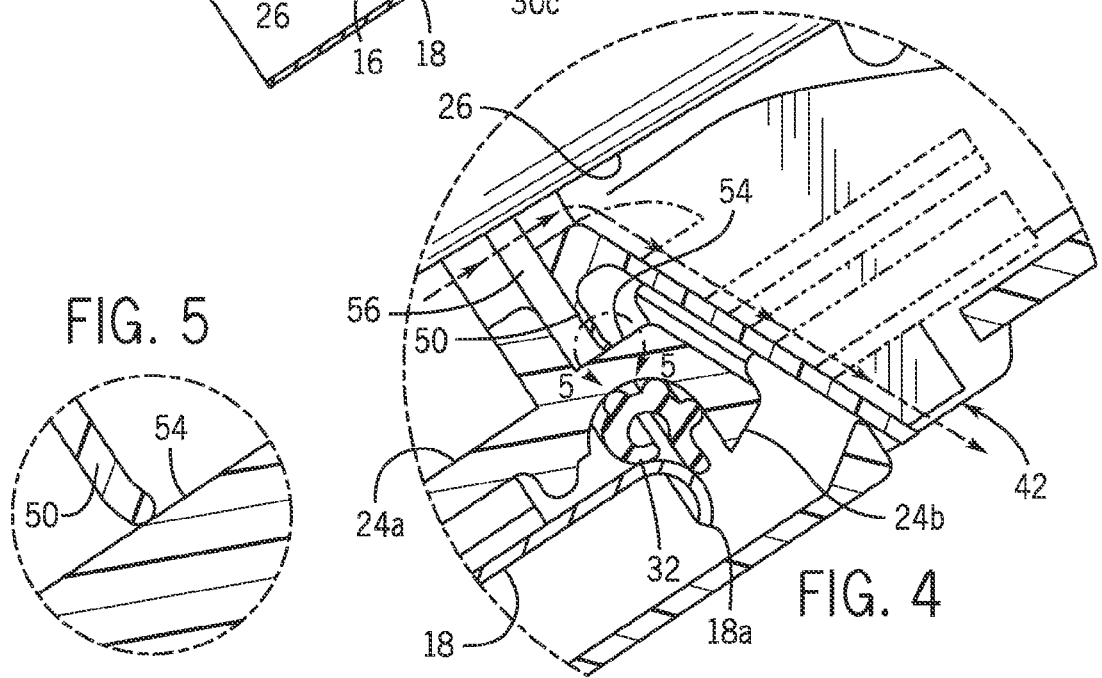
FIG. 4 is a partial enlarged view taken within the line 4-4 of FIG. 3.
Figure 5:
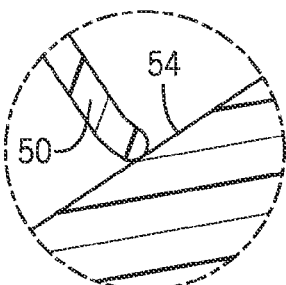
FIG. 5 is a partial enlarged view taken from FIG. 4 showing a radial flange cooperatively engaged within a mating wall to seal a main flap unit and a shutter unit, both comprising the fuel filler assembly.

In the illustrated embodiment, the mating wall is the cylindrical wall 54 that is included on the main flap unit 16 and the radial flange is radial flange 50 included on the shutter unit 20. As best shown in FIGS. 4 and 5, sealing contact or engagement between the radial flange 50 and the cylindrical wall 54 can be via interference fit thereby sealing the main flap unit 16 and the shutter unit 20. As shown, the radial flange 50 extends radially outwardly from the shutter housing 30 and sealingly engages the cylindrical wall 54 that is generally parallel to an axis of the filler tube 12 (and parallel to an axis of the main flap housing 24). In particular, in the illustrated embodiment, the cylindrical wall 54 defines a counterbore recess 56 within the main flap housing 24 that accommodates the axial insertion portion 30a of the shutter housing 30. More specifically, the radial flange 50 extends radially outwardly from the axial insertion portion 30a and the counterbore recess 56 receives the axial insertion portion 30a. To form the interference fit, and for purposes of example only, the outer diameter of the radial flange 50 can be approximately 45 mm and the inner diameter of the cylindrical wall 54 can be 42 mm, though other interference fit dimensions could be used. Alternatively, though not shown, the radial flange could be disposed on the main flap unit 16 (e.g., projecting radially inwardly from the cylindrical wall 54) to sealing contact the shutter unit 20.

Advantageously, the cooperative engagement and the interference fit between the main flap housing 24 and the shutter housing 30 via the sealing contact between the radial flange 50 and the cylindrical wall 54 seals the main flap housing 24 to the shutter housing 30 and prevents fuel from leaking therebetween. Additionally, this cooperative engagement and interference fit between the main flap unit 16 and the shutter unit 20 inhibits spilled fuel from leaking therebetween and instead directs spilled fuel to the radial drain 42 of the shutter unit 20. Sealing between the main flap housing 24 and the shutter housing 30 occurs without a gasket-type seal such as is used in conventional capless assemblies. This has the advantage of reducing the cost and/or complexity of the filler assembly 10.

An additional feature is the shape and/or size of the radial flange 50. In particular, and as shown, the radial flange 50 can be relatively thin (e.g., 4 mm). This is to allow flexibility in an axial direction. In particular, the radial flange 50 can have an axial thickness relative to a radial length (e.g., as shown) that permits axial flexing of the radial flange 50. Advantageously, the thinness of the radial flange 50 can allow flexibility of the radial flange 50 in response to interference with the cylindrical wall 54.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fuel filler assembly for a vehicle, comprising:
   a main flap unit connected to a fuel filler pipe adjacent a filling end thereof;
   a main flap pivotally disposed on the main flap unit for selectively closing access to the filling end of the fuel filler pipe;
   a shutter unit connected to the fuel filler pipe adjacent the filling end thereof and engaging the main flap unit;
   a shutter pivotally disposed on the shutter unit for selectively closing access to the filling end of the fuel filler pipe; and
   wherein cooperative engagement between the main flap unit and the shutter unit seals the main flap unit and the shutter unit together and prevents fuel from leaking therebetween, and
   wherein the shutter unit defines a radial drain for directing spilled fuel and wherein said cooperative engagement between the main flap unit and the shutter unit inhibits spilled fuel from leaking therebetween and instead directs spilled fuel to the radial drain of the shutter unit.

2. The fuel filler assembly of claim 1 wherein the cooperative engagement includes a radial flange disposed on one of the main flap unit and the shutter unit and a mating wall disposed on the other of the main flap unit and the shutter unit, the flange in sealing contact with the mating wall.

3. The fuel filler assembly of claim 2 wherein the sealing contact is via interference fit thereby sealing between the main flap unit and the shutter unit.

4. The fuel filler assembly of claim 2 wherein the radial flange extends radially and the mating wall is a cylindrical wall that is generally parallel to an axis of the fuel filler pipe.

5. The fuel filler assembly of claim 4 wherein the cylindrical wall is included on the main flap unit and the radial flange is included on the shutter unit.

6. The fuel filler assembly of claim 5 wherein the cylindrical walls defines a counterbore recess that accommodates an insertion portion of the shutter unit.

7. The fuel filler assembly of claim 2 wherein the radial flange has an axial thickness that is thin enough to provide axial flexibility to the radial flange for accommodating an interference fit relationship between the radial flange and the mating wall.

8. The fuel filler assembly of claim 2 wherein the radial flange has an axial thickness relative to a radial length that permits axial flexing of the radial flange.

9. The fuel filler assembly of claim 1 wherein the shutter unit includes an outer wall portion that annularly surrounds the main flap unit and an insertion portion that is received radially within the main flap unit.

10. The fuel filler assembly of claim 1 wherein sealing between the main flap unit and the shutter unit occurs without gasket-type seal.

11. A capless fuel filler assembly, comprising:
a filler tube connected to a fuel tank;
a main flap housing secured to the filler tube, the main flap housing having a pivoting flap adapted to be pivoted open by an associated fuel nozzle; and
a shutter housing secured to the filler tube, the shutter housing having a pivoting shutter also adapted to be pivoted open by an associated fuel nozzle, the shutter housing arranged so that the associated fuel nozzle first opens the pivoting shutter and subsequently opens the pivoting flap when inserted into the filler tube for refueling the fuel tank, the shutter housing cooperatively engaging the main flap housing to seal therebetween, wherein the shutter housing has an axial insertion portion with a radial flange extending radially outwardly therefrom, and wherein the main flap housing has a cylindrical wall defining a recess that receives the axial insertion portion, the cylindrical wall forming a mating wall to which radial flange is in sealing contact.

12. The capless fuel filler assembly of claim 11 wherein sealing between the main flap housing and the shutter housing occurs without gasket-type seal.

13. The capless fuel filler assembly of claim 11 wherein the recess is a counterbore recess.

14. The capless fuel filler assembly of claim 13 wherein an interference fit is formed between the radial flange and the portion of the main flap housing defining the mating wall.

15. The capless fuel filler assembly of claim 14 wherein the radial flange is thin to allow flexibility in an axial direction.

16. The capless fuel filler assembly of claim 11 wherein the main flap housing and the shutter housing are each formed of a plastic material.

17. A capless fuel filler assembly for a vehicle, comprising:
a main flap housing securable to a fuel filler pipe, the main flap housing having a main flap pivotally disposed thereon and a cylindrical wall defining a recess;
a shutter housing secured to the main flap housing, the shutter housing having a shutter flap pivotally disposed thereon and an axial insertion portion with a flange extending radially outwardly therefrom; and
a cooperative engagement between the main flap housing and the shutter housing that seals therebetween and prevents fuel from leaking between the main flap housing and the shutter housing, said cooperative engagement includes receipt of the axial insertion portion into the recess of the main flap housing and sealing contact between the flange and the cylindrical wall.

18. The capless fuel filler assembly of claim 17 wherein the cooperative engagement is formed between a radial flange and a mating wall of the main flap housing that is oriented generally parallel to an axis of the main flap housing.

19. The capless fuel filler assembly of claim 18 wherein the cooperative engagement includes an interference fit between the radial flange and the cylindrical wall.

20. The capless fuel filler assembly of claim 17 wherein the shutter housing defines a radial drain for directing spilled fuel and wherein said cooperative engagement between the main flap housing and the shutter housing inhibits spilled fuel from leaking therebetween and instead directs spilled fuel to the radial drain of the shutter housing.

* * * * *